United States Patent
Bangel et al.

(10) Patent No.: US 7,328,203 B2
(45) Date of Patent: Feb. 5, 2008

(54) SYSTEM AND METHOD FOR EXECUTING COMPLEX IF-THEN CLAUSES

(75) Inventors: Matthew J. Bangel, Poughkeepsie, NY (US); Scott D. Hicks, Undershill Center, VT (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 11/014,285

(22) Filed: Dec. 16, 2004

(65) Prior Publication Data

US 2006/0184478 A1 Aug. 17, 2006

(51) Int. Cl.
*G06N 5/00* (2006.01)
(52) U.S. Cl. .............................. 706/57; 706/45; 341/50; 714/46
(58) Field of Classification Search ................... 706/57, 706/45; 370/241, 342; 714/46; 341/50
See application file for complete search history.

(56) References Cited

U.S. PATENT DOCUMENTS

| | | | | |
|---|---|---|---|---|
| 4,034,195 A | * | 7/1977 | Bates | 714/46 |
| 5,187,330 A | * | 2/1993 | Holcroft | 178/18.05 |
| 5,652,580 A | * | 7/1997 | Saxena | 341/50 |
| 5,966,376 A | * | 10/1999 | Rakib et al. | 370/342 |
| 5,991,308 A | * | 11/1999 | Fuhrmann et al. | 370/395.53 |
| 6,044,063 A | * | 3/2000 | Kolagotla et al. | 370/241 |

\* cited by examiner

*Primary Examiner*—Wilbert L Starks, Jr.
(74) *Attorney, Agent, or Firm*—John R. Pivnichny; Shelley M Beckstrand

(57) ABSTRACT

Complex nested if-then statement on data objects in a digital computer are organized as a plurality of logical case statements; for each case statement, a set of binary condition arrays is provided and for each data object a condition set. Case statements are executed on the data objects for which a condition array from the set of binary condition arrays matches the condition set for the data object.

11 Claims, 6 Drawing Sheets

| DATA OBJECTS FILE – NOT SORTED | | | | | |
|---|---|---|---|---|---|
| DIVISION | DEPT | USAGE | ADAPTER | | |
| 07 | ABC | OFFICE | ADP001 | | |
| 10 | EFG | MOBILE | ADP03 | | |
| 07 | ABC | OFFICE | ADP001 | | |
| 07 | ABC | OFFICE | ADP001 | | |
| 07 | ABC | LAB | ADP002 | | |
| 10 | EFG | MOBILE | ADP003 | | |
| 10 | EFG | MOBILE | ADP003 | | |
| 07 | ABC | OFFICE | ADP001 | | |
| 99 | ZZZ | LAB | ADP09 | | |
| 07 | ABC | OFFICE | ADP001 | | |
| ⋮ | | | | | |

| BILLING FILE 240 | | | | | |
|---|---|---|---|---|---|
| DIV | DEPT | USAGE | ADAPTER | QTY | CUMM COST |
| 07 | ABC | OFFICE | ADP001 | 5 | 50 |
| 07 | ABC | LAB | ADP002 | 1 | 15 |
| 10 | EFG | MOBILE | ADP03 | 3 | 60 |
| 99 | ZZZ | LAB | ADP09 | 1 | 25 |
| 202 | 204 | 206 | 208 | 242 | 244 |

FIG. 6

SYSTEM AND METHOD FOR EXECUTING COMPLEX IF-THEN CLAUSES

BACKGROUND OF THE INVENTION

1. Technical Field of the Invention

This invention relates to computer programming. More particularly, it relates to alternatively re-organizing complex IF-THEN clauses as case statements based on binary condition strings.

2. Background Art

In very complex agents, nested IF-THEN clauses can become unwieldy, adversely affecting program performance through unnecessary and/or redundant checking of conditions.

In addition, complex nesting of IF-THEN clauses results in program code that is very difficult for the programmer maintain and enhance. Nested IF-THEN clauses, even with simple conditions and code blocks, are often inherently difficult for many programmers to navigate through during maintenance. When the evaluated conditions and code blocks requiring conditional execution become complex, the problem is exacerbated. Despite the best efforts of the original programmer to comment the code, steep learning curves result for future programmers inheriting it. Additionally, the code becomes much more prone to logic errors and even more redundancy.

SUMMARY OF THE INVENTION

A system, method and program storage device are provided for executing complex nested if-then statement on data objects in a digital computer by organizing the if-then statements as a plurality of logical case statements; for each case statement, providing a set of binary condition arrays; determining a condition set for a data object; and executing on the data object a case statement for which a condition array from the set of binary condition arrays matches the condition set for the data object.

Other features and advantages of this invention will become apparent from the following detailed description of the presently preferred embodiment of the invention, taken in conjunction with the accompanying drawings.

BRIEF DESCRIPTION OF THE DRAWINGS

FIG. 6 illustrates a billing file resulting from the processing of FIG. 5.

DETAILED DESCRIPTION OF PREFERRED EMBODIMENTS

In accordance with the preferred embodiment of the invention, complex nested if-then clauses are implemented as case statements with conditions represented as binary arrays.

Figure 1:
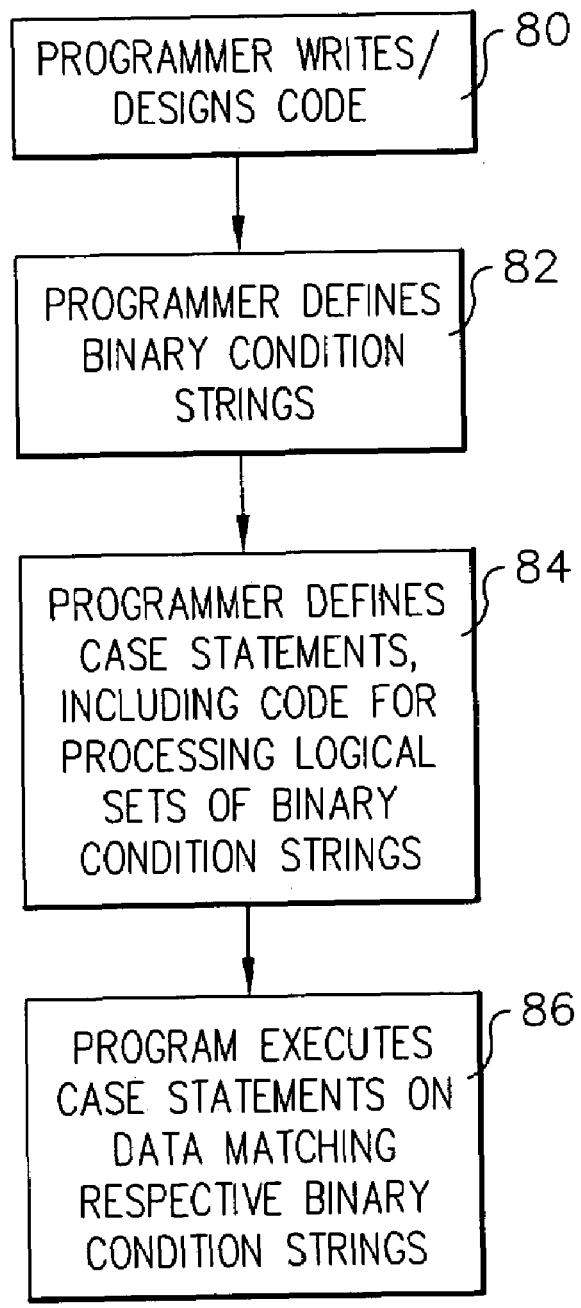
FIG. 1 is a flow diagram illustrating the process of the invention for organizing complex IF-THEN clauses into case statements with conditions represented as binary arrays.

Referring to FIG. 1, the process of the invention for organizing complex IF-THEN clauses into case statements with conditions represented as binary arrays begins in step 80 with the programmer designing the code. Such code typically includes a complex set of IF-THEN clauses characterized by various attributes and variables, collectively referred to herein as conditions. In step 82, the programmer defines a plurality of binary strings collecting these conditions into a binary array of conditions. In step 84, the programmer organizes these arrays into logical sets for execution with respective case statements. In step 86, the resulting case statements are executed on input data selected with reference to respective logical sets of binary condition arrays.

Figure 2:
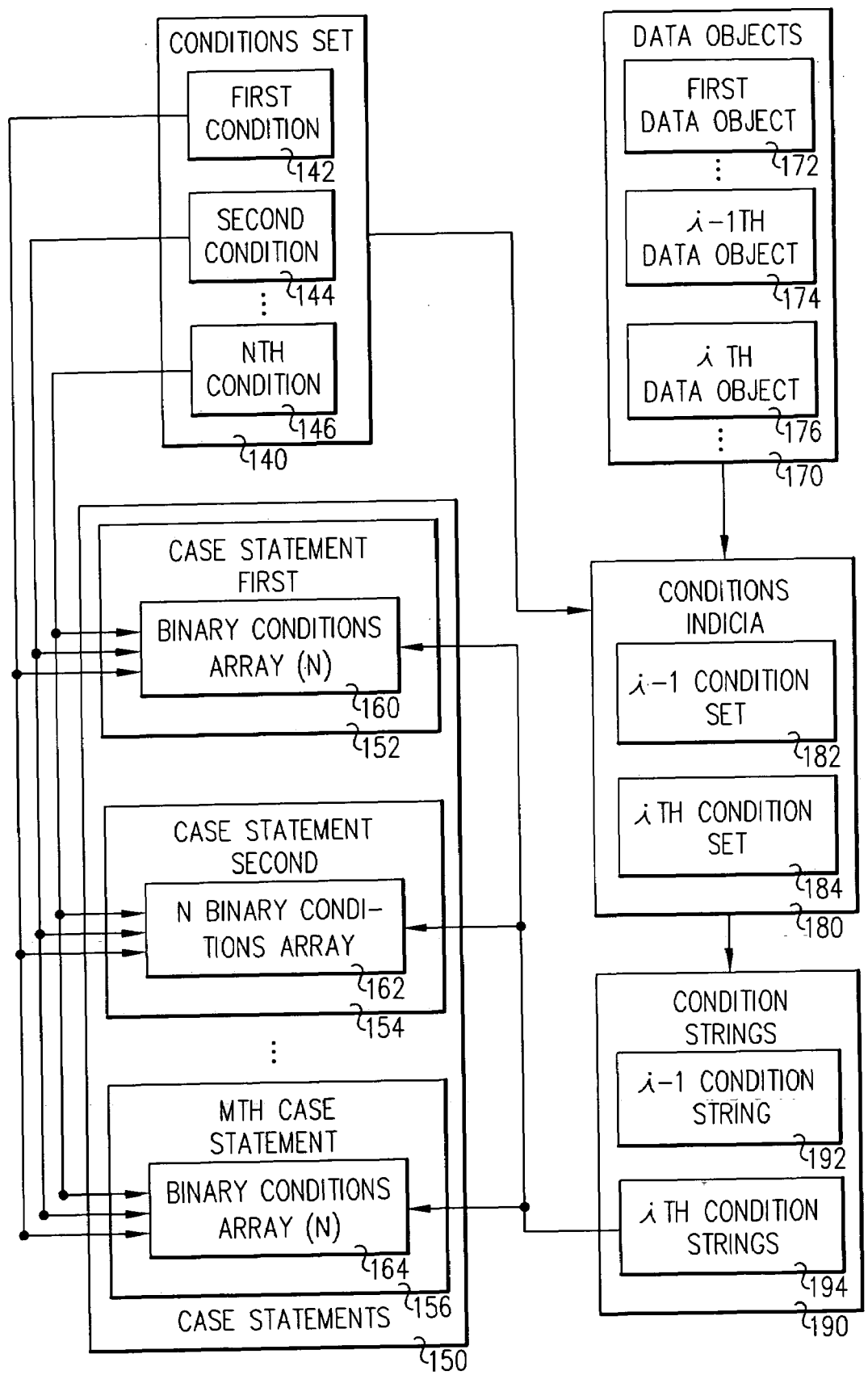
FIG. 2 is a high level system diagram illustrating the structure of case statements according to a preferred embodiment of the invention.

Referring to FIG. 2, the structure of case statements according to a preferred embodiment of the invention includes a condition set object 140 and a set of case statements 150.

Condition set object includes first condition (indicia representing an attribute, variable, or other value characteristic of a data object) 142, second condition 144, and so on to Nth condition 146. (In the example of FIGS. 4, 5, and 6, these attributes would be division 202, department 204, usage 206, and adapter 208, and are the attributes tested in the code of Table 1 at lines 9, 15, 21, and 27 respectively.)

Case statement object 150 includes first case statement 152, second case 154, and so on to Mth case 156. Each of these case statements includes respective binary conditions arrays 160, 162, 164 for selecting the case, and code for executing the case on data satisfying its conditions array. (In the example of FIG. 5, these case statements are new division 210, new department 212, new usage 214, new adapter 216, and no change 218. The respective binary conditions are represented in FIG. 5 by condition arrays 160-168 and in the example of Table 1 by lines 36-37, 59, 73, 87, and 99, respectively.)

Referring further to FIG. 2, data objects 170 include first data object 172, i-1th data object 174, ith data object 176, and so on. (In the example of FIGS. 4 and 5, these data objects are represented by rows in tables 170 and 200.) As will be described hereafter, these data objects are tested with respect to conditions set 140 to generate conditions indicia 180 including condition set 182 for data object i-1 and condition set 184 for data object i. The resulting condition sets 182, 184 are processed to generate conditions strings 190, including condition string 192 for the i-1th data object, and condition string 194 for the ith condition string. (In the example of FIG. 5, an example of these condition strings is illustrated.) Each condition string 190 is compared in order 1, ..., i-1th, ith, ... to binary condition arrays 160, 1162, 164 until a match is found, and the corresponding case statement 152, 154, 156 executed on the data object matching its binary condition array.

Figure 3:
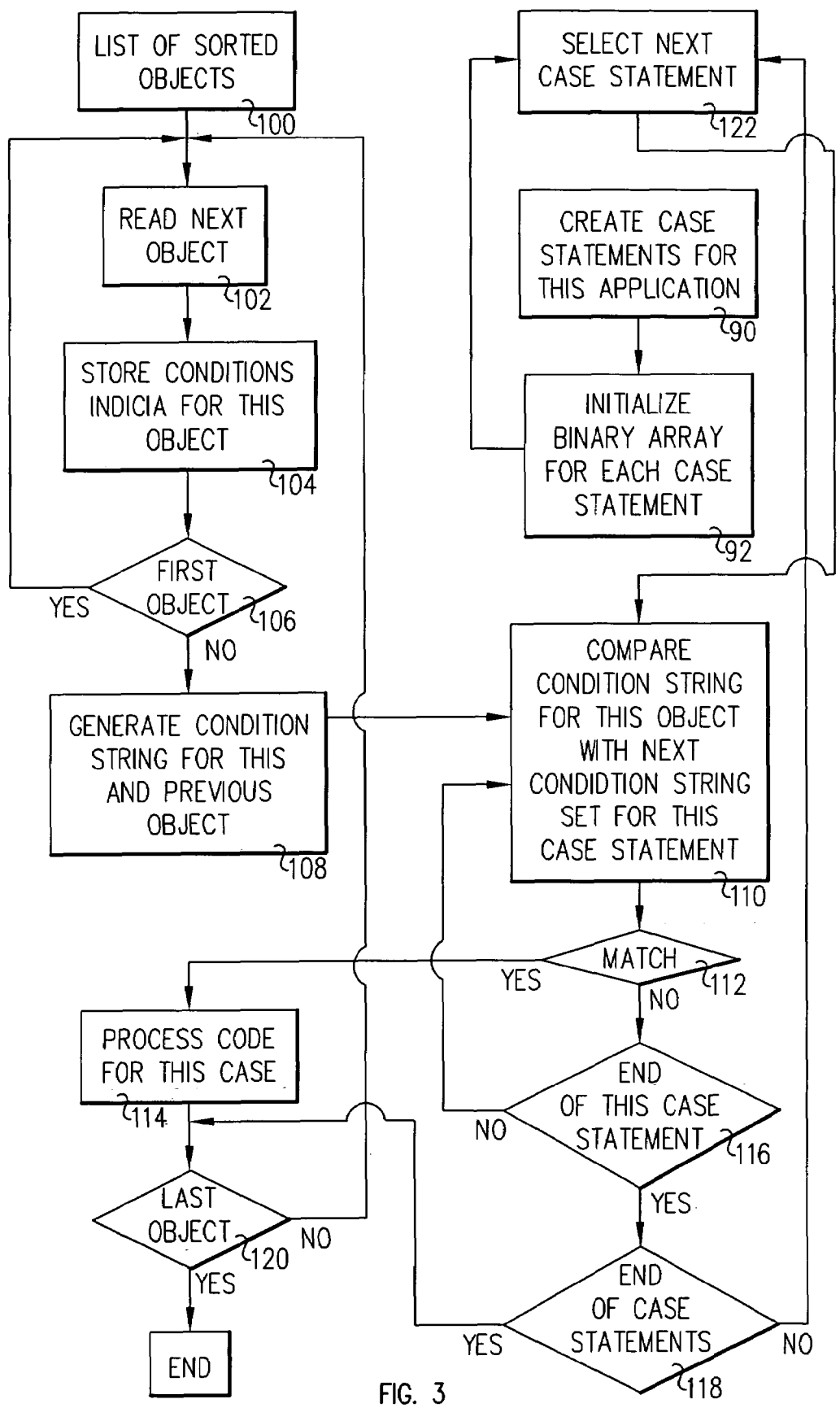
FIG. 3 is a flow diagram illustrating the processing data by code including the case statements and binary condition arrays of a preferred embodiment of the invention.

Referring to FIG. 3, the processing of data by code including the case statements and binary condition arrays of an exemplary embodiment of the invention includes in step 90 creating case statements for this application, and in step 92 initializing a binary array 160, 162, 164, 166 168, for each case statement 210-218. This is the work of steps 80, 82, 84 of FIG. 1.

Figure 5:
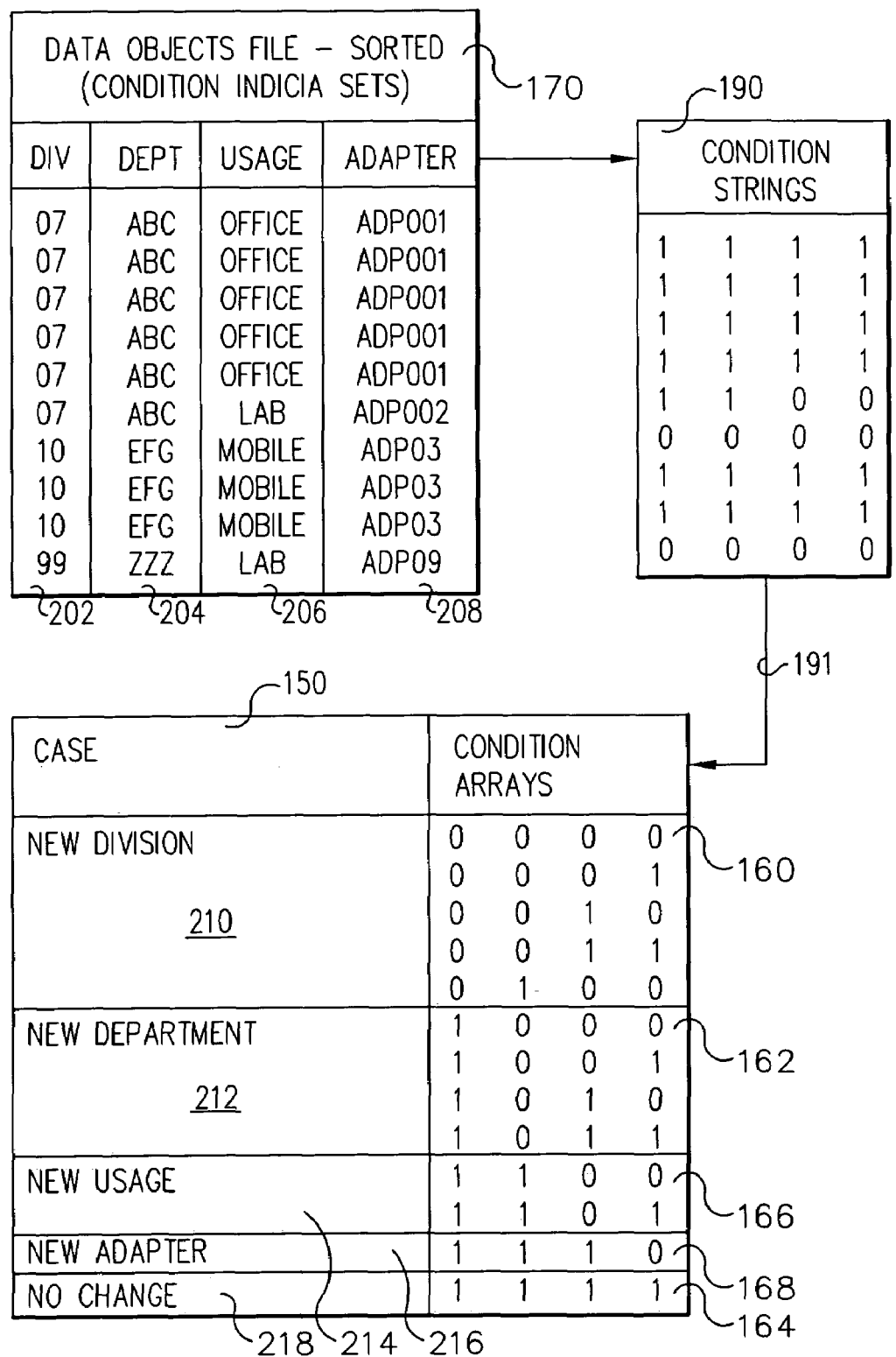
FIG. 5 is a diagrammatic illustration of processing the input data file of FIG. 4.

Processing of input data begins with a list of sorted objects 100 (See also FIG. 5. In FIG. 2 these are objects 170). In step 102, each object 170 is read and in step 104 its conditions indicia stored, as is represented by the rows in sorted data objects file 170.) In step 106, if this object is the first data object 172, step 102 is performed to pick up the second data object. This is done because, in this example, conditions 140 are generated by comparing successive pairs of data objects 174, 176. Once a pair of data objects is found in step 106, step 108 is executed to generate a condition string 190 from condition sets 182, 184. (See FIG. 5 for an example of condition strings 190.)

In step 122, the next case statement 150 is selected, and in step 110 the condition string for this object 194 is compared, as is represented by line 191 in FIG. 5, with the next binary condition array 160-168 from step 92 for that next case statement.

If a match is found in step 112, in step 114 the code for this case is executed. If no match is found in step 112, if in step 116 it is determined that there are more binary condition arrays for this case statement, then processing returns to step 110. (For example, in FIG. 5, there are five such arrays 160 for case 210.) If, however, it is determined in step 116 that there are no more condition arrays for this case, and in step 118 that this case has been the last (case 218 in the example of FIG. 5), then processing continues to step 120 and thence to end or to step 102 for a next data object.

Figures 4, 7:
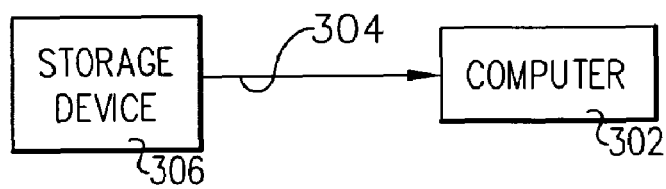
FIG. 4 illustrates an unsorted data objects file, input to an exemplary embodiment of the invention.
FIG. 7 is a high level system diagram illustrating a program storage device readable by a machine, tangibly embodying a program of instructions executable by a machine to perform method steps for executing case statements selected with reference to respective binary condition arrays.

Referring to FIG. 4, an unsorted data objects file is represented by way of example including a plurality of data objects represented by the rows of the table, each characterized by a set of attributes 202, 204, 206, 208.

Referring to FIG. 5, the unsorted data objects file 200 has been sorted on a logical ordering of attributes into sorted data objects file 170. Each data object (after the first) is compared to the previous data object to generate respective condition strings 190. In condition strings 190, a "1" indicates that the corresponding attribute 202-208 for this object is the same as that for the preceding object in sorted list 170. Thus, a condition string 190 of 1111 indicates that division, department, usage, and adapter of this data object is the same as the division, department, usage, and adapter of the preceding data object. A condition object of 1100 indicates that the division and department are the same, but usage and adapter are different. In condition string 190, the first bit refers to division, the second to department, the third to usage, and the fourth to adapter.

In the example of FIG. 5 (and Table 1), program logic has been organized into five case statement: new division 210 with condition arrays 160, new department 212 with condition arrays 162, new usage with condition arrays 166, new adapter with condition array 168, and no change with condition array 164. This ordering of case statements corresponds to the sort order for sorting data objects file, thus providing efficiency in processing of data set 170.

As is represented by line 191, and as has been previously described, the condition string for this data object (one of strings 190) is compared with condition arrays 160, then 162, then 166, then 168, then 164 until a match is found and the corresponding case statement 150 is executed on that data.

Referring to Table 1, an example illustrates (primarily in pseudo code) the process by which various conditions are checked prior to entering the case statement, and then arranging the case statement logically to optimize performance, readability and maintainability.

TABLE 1

EXAMPLE (PSUEDO-CODE LISTING)

```
1   'set system variables
2   'check for error conditions
3   'check for OLE support
4   'begin processing, refresh all views
5   'initialize variables
6   'get first document
7   'establish conditions
8       'same division?
9           If prevdiv = currdiv Then
10              divsame="1"
11          Else
12              divsame="0"
13          End If
14      'same department?
15          If prevdept = currdept Then
16              deptsame="1"
17          Else
18              deptsame="0"
19          End If
20      'same usage (machine type)?
21          If prevusage = currusage Then
22              usagesame="1"
23          Else
24              usagesame="0"
25          End If
26      'same adapter?
27          If prevadapter = curradapter Then
28              adpatersame="1"
29          Else
30              adaptersame="0"
31          End If
32  'begin processing of adapters, cables, HW and ABE charges
33
34      'select case    divsame + deptsame +usagesame +
35                      adaptersame
36      case            "0000", "0001", "0010", "0011", "0100",
37                      "0101", "0110", "0111"
38      'new division   (conditions where divsame = "0")
39      ...
40          'write last adapter line to prev div file
41          'write last cable line to prev div file
42          'write last HW distr chrg line to prev div file
43          'write last ABE charge line to prev div file
44          'write all MDO information
45          'write all RIT information
46          'close prev div file
47          'open new div spreadsheet
48          'write first line to spreadsheet
49              'MDO cost info
50              'RIT cost info
51          'set prev=current
52              prevdiv = currdiv
53              prevusage = currusage
54              prevdept = currdept
55              prevadapter = curradapter
56          're-initialize totals
57      'select case    divsame + deptsame +usagesame +
58                      adaptersame
59      case "1000", "1001", "1010", "1011":
60      'new department     (conditions where divsame = "1" and
61                          deptsame = "0")
62          'write last adapter line to prev div file
63          'write last cable line to prev div file
64          'write all MDO information
65          'write all RIT information
66          'set prev=current
67              prevdept = currdept
68              prevusage = currusage
69              prevadapter = curradapter
70          're=initialize totals
71      'select case    divsame + deptsame +usagesame +
72                      adaptersame
73      Case "1100", "1101":
74      'new usage          (conditions where divsame = "1",
75                          deptsame = "1", and usagesame =
76                          "0")
77          'write last adapter line to prev div file
```

TABLE 1-continued

EXAMPLE (PSUEDO-CODE LISTING)

```
78               'write last cable line to prev div file
79               'write all MDO information
80               'write all RIT information
81               'set prev=current
82                       prevusage = curusage
83                       prevadapter = curradapter
84               're-initialize totals
85          'select case   divsame + deptsame +usagesame +
86                         adaptersame
87          Case "1110":
88          'new adapter      (condition where divsame = deptsame
89                            = usagesame = "1", and adaptersame
90                            = "0")
91               'write last adapter line to prev div file
92               'write all MDO information
93               'write all RIT information
94               'set prev=current
95                       prevadapter = curradapter
96               're-initialize totals
97          'select case   divsame + deptsame +usagesame +
98                         adaptersame
99          Case "1111":
100         'nothing new      (condition where divsame = deptsame
101                           = usagesame = adaptersame = "1")
102              '...
103              'MDO cost info
104              'RIT cost info
105              '...
106
107              End Select
108         wend      'have completed comparing documents
109           '        close billing file
110           '        compare what was billed last month with what
111                    should have been billed and apply necessary
112                    adjustments to billing
113         'close
```

In the example of Table 1, a billing agent characterized by IF THEN statements of extreme complexity represented a maintenance nightmare. This was adapted by the process of FIG. 1 into case statements entered by, or executed responsive to, condition strings (lines 36-37, 59, 73, 87, and 99). In lines 7-31, before entering main body of code with the case statements, conditions are checked and flags set. These flags are concatenated into a string, or binary array. The first case (lines 36-37) has a zero for the first character in the array for all cases, which is interpreted as a new division. The second case (line 59) has a zero in the second character of the array for all cases, which is interpreted as new department. An so on. The last case (line 99) has a one in each character of the array, which is interpreted as no change. The various data objects represent billable activities. This are sorted in order of division, department, usage, and adapter, and processed as described in connection with FIGS. 3-6.

ADVANTAGES OVER THE PRIOR ART

It is an advantage of the invention that there is provided an improved system and method for structuring complex nested if-then clauses.

ALTERNATIVE EMBODIMENTS

It will be appreciated that, although specific embodiments of the invention have been described herein for purposes of illustration, various modifications may be made without departing from the spirit and scope of the invention. Referring to FIG. 7, in particular, it is within the scope of the invention to provide a computer program product or program element, or a program storage or memory device 300 such as a solid or fluid transmission medium 310, magnetic or optical wire, tape or disc 306, or the like, for storing signals readable by a machine as is illustrated by line 304, for controlling the operation of a computer 302 according to the method of the invention and/or to structure its components in accordance with the system of the invention.

Further, each step of the method may be executed on any general purpose computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for structuring complex nested if-then statements in program code executing on data objects in a digital computer to facilitate computer programer maintenance and enhancement, and to improve program performance, of said program code, comprising:

organizing said if then statements as a plurality of logical case statements;

for each said case statement, providing a set of binary condition arrays;

determining a condition set for a data object;

executing on said, data object a case statement for which a condition array from said set of binary condition arrays matches said condition set for said data object; and presenting said case statements at a computer output device to said computer programer for maintenance and enhancement of said program code.

2. The method of claim 1, further comprising:

sorting said data objects on a logical ordering of attributes into a sorted data set including this data object and for each this data object its immediately previous data object in logical sort order; and deriving from successive data objects said condition set, with each character of said condition set being a binary value respectively representing whether or not an attribute of this data object is identical to a corresponding attribute from said previous data object.

3. The method of claim 2, further comprising:

providing in each said case statement execution code common to processing of each data object having said condition set matching a condition array for said case statement.

4. The method of claim 3, further comprising:

ordering said case statements for execution in logical order corresponding to said sort order.

5. A computer system for executing complex IF-THEN statements in program code to facilitate computer programer maintenance and enhancement, and to improve program performance, of said program code, comprising:

a digital computer including a conditions set element;

a data objects element; a conditions indicia set element; a conditions string element; and a plurality of case statements, each case statement having a respective binary conditions array;

a conditions indicia element for storing a set of conditions for each said data object;

a conditions string element for storing for each said data object a binary condition string representative of correspondence on attributes of successive data objects;

said computer comparing said binary condition strings of successive data objects with successive binary condition arrays to determine which of said case statements is to process said data object; and a computer output device for presenting said case statements to said computer programer for maintenance and enhancement of said program code.

6. The system of claim 5, further comprising:

said computer sorting said data objects on a logical order of said attributes; and said case statements ordered according to said logical order.

7. A program storage device readable by a machine, tangibly embodying a program of instructions executable by a machine for structuring complex nested if-then statements in program code executing on data objects in a digital computer to facilitate computer programer maintenance and enhancement, and to improve program performance, of said program code, comprising:

a digital computer readable storage medium;

first program instructions for organizing said if-then statements as a plurality of logical case statements;

second program instructions, for each said case statement, for providing a set of binary condition arrays;

third program instructions for determining a condition set for a data object)

fourth program instructions for executing on said data object a case statement for which a condition array from said set of binary condition arrays matches said condition set for said data object;

fifth program instructions for presenting said case statements at a computer output device to said computer programer for maintenance and enhancement of said program code; and wherein said first, second, third, fourth, and fifth program instructions are recorded on said digital computer readable storage medium.

8. The program storage device of claim 7, further comprising:

sixth program instructions for sorting said data objects on a logical ordering of attributes into a sorted data set including this data object and for each this data object its immediately previous data object in logical sort order;

seventh program instructions for deriving from successive data objects said condition set, with each character of said condition set being a binary value respectively representing whether or not an attribute of this data object is identical to a corresponding attribute from said previous data object; and wherein said sixth and seventh program instructions are recorded on said digital computer readable storage medium.

9. The program storage device of claim 8, further comprising:

eighth program instructions for providing in each said case statement execution code common to processing of each data object having said condition set matching a condition array for said case statement; and wherein said eighth program instructions are recorded on said digital computer readable storage medium.

10. The program storage device of claim 9, further comprising:

ninth program instructions for ordering said case statements for execution in logical order corresponding to said sort order; and wherein ninth program instructions are recorded on said digital computer readable storage medium.

11. A computer program product for controlling the operation of a digital computer to enhance computer programmer maintenance of program code initially executing complex nested if-then statements according to the method comprising:

organizing said if-then statements as a plurality of logical case statements;

for each said case statement, providing a set of binary condition arrays;

determining a condition set for a data object;

executing on said data object a case statement for which a condition array from said set of binary condition arrays matches said condition set for said data object;

presenting said case statements at a digital computer output device to a computer programmer to enable enhancement and maintenance of said program code;

receiving from said computer programmer modified case statements for executing enhanced program code.

* * * * *